(12) United States Patent
Ozawa et al.

(10) Patent No.: US 6,647,148 B2
(45) Date of Patent: Nov. 11, 2003

(54) BOUNDARY LINE DETECTING METHOD

(75) Inventors: Toshiaki Ozawa, Niigata-ken (JP); Shoichi Moriyama, Niigata-ken (JP); Hiroshi Aimura, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/847,713

(22) Filed: May 2, 2001

(65) Prior Publication Data

US 2001/0016983 A1 Aug. 30, 2001

Related U.S. Application Data

(62) Division of application No. 09/126,026, filed on Jul. 29, 1998, now Pat. No. 6,330,742.

(30) Foreign Application Priority Data

Jul. 31, 1997 (JP) .............................................. 9-206105

(51) Int. Cl.[7] .................................................. G06K 9/48
(52) U.S. Cl. ........................ 382/199; 382/151; 382/218; 382/291; 348/95; 700/186
(58) Field of Search ................................ 382/141–147, 382/151, 162, 164, 165, 173, 174, 181, 190, 199, 203, 205, 206, 218–219, 242–243, 266, 272–273, 291, 152; 348/86, 94–95, 98; 700/95, 186; 29/603.04, 603.06, 603.09

(56) References Cited

U.S. PATENT DOCUMENTS

| | | | | |
|---|---|---|---|---|
| 4,183,013 A | * | 1/1980 | Agrawala et al. ............ | 382/173 |
| 4,648,120 A | * | 3/1987 | Chittineni ................... | 382/266 |
| 4,866,836 A | | 9/1989 | Von Brandt et al. ..... | 29/603.06 |
| 4,896,364 A | * | 1/1990 | Lohscheller ................ | 382/162 |
| 5,065,331 A | * | 11/1991 | Vachon et al. ............. | 356/35.5 |
| 5,091,963 A | * | 2/1992 | Litt et al. ................... | 382/149 |
| 5,168,530 A | * | 12/1992 | Peregrim et al. ........... | 382/199 |
| 5,262,852 A | * | 11/1993 | Eouzan et al. ................ | 348/39 |
| 5,835,614 A | * | 11/1998 | Aoyama et al. ............ | 382/104 |
| 6,055,329 A | * | 4/2000 | Mufti ......................... | 382/152 |

OTHER PUBLICATIONS

Feng, et al. "Epicardial Boundary Detection Using Fuzzy Reasoning", IEEE, pp. 187–199, 1991.*
"An Efficient Algorithm for Computation of Shape Moments from Run–Length Codes or Chain Codes"; Dai et al.; Pattern Recognition; vol. 25, No. 10; pp. 1119–1128; 1992.

* cited by examiner

*Primary Examiner*—Daniel G. Mariam
(74) *Attorney, Agent, or Firm*—Brinks Hofer Gilson & Lione

(57) ABSTRACT

In detecting a boundary line between areas different in light reflectance, it has so far been impossible to specify the boundary line at a distance shorter than the arrangement pitch of photodetectors (pixels) arranged in the camera. In the present invention, luminance variations near the boundary line between areas different in light reflectance are derived. Further, in unit blocks G corresponding to pixels and arranged in a direction (Y direction) in which the boundary line extends, derived values of luminance for each row of unit blocks are added and then a variation curve of the added values of derived luminance values in unit block rows is drawn to specify a peak position thereof and also specify the position of the boundary line X0. Thus, it is possible to specify the position of the boundary line with a high accuracy at a distance shorter than the unit block pitch.

4 Claims, 7 Drawing Sheets

FIG. 6A
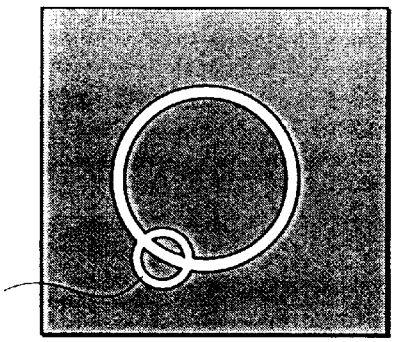
FIG. 6B
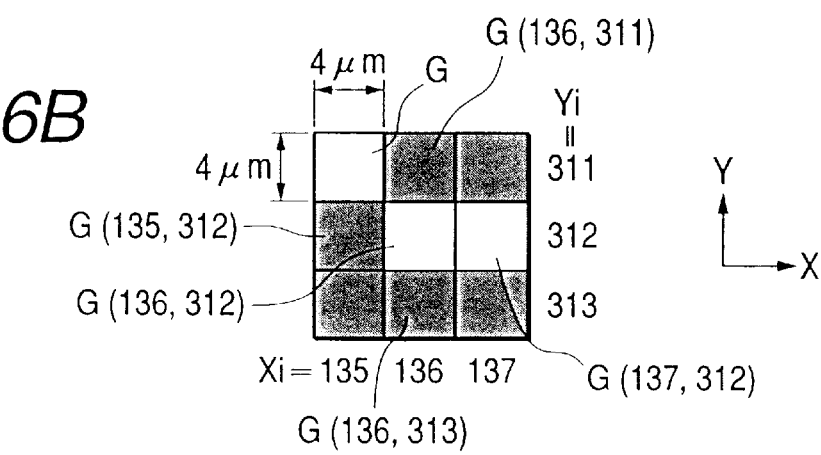
FIG. 6C
DERIVATED VALUES
OF LUMINANCE (ai)
| | | | Yi = |
|---|---|---|---|
| 127 | 90 | 71 | 311 |
| 56 | 121 | 135 | 312 |
| 70 | 70 | 82 | 313 |
Xi = 135  136  137
PIXEL POSITION COORDINATES (Y AXIS)
PIXEL POSITION COORDINATES (X AXIS)
G (136, 312)
FIG. 6D
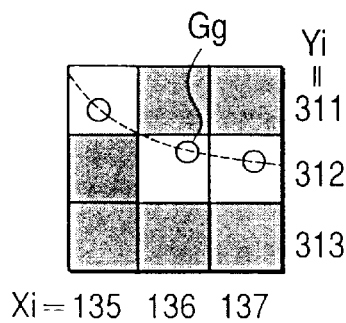

BOUNDARY LINE DETECTING METHOD

This application is a divisional application of U.S. application Ser. No. 09/126,026 filed on Jul. 29, 1998, (which is now U.S. Pat. No. 6,330,742 issued Dec. 18, 2001) entitled "Boundary Line Detecting Method and Magnetic Head Positioning Method and Apparatus Using Same".

BACKGROUND OF THE INVENTION

1. Field of the Invention

The present invention relates to a boundary line detecting method for specifying, by image processing, a boundary line between areas different in reflected light intensity, as well as a positioning method and apparatus for positioning, using the detecting method, for example a magnetic head body for a hard disk device and a support member such as a load beam relative to each other.

2. Description of the Prior Art

FIG. 8A is a plan view showing a conventional magnetic head positioning apparatus and FIG. 8B is a side view thereof.

A magnetic head body 1, which is for a hard disk device, comprises a slider and a recording portion and a reproducing portion both of a thin film structure disposed at a trailing-side end portion of the slider. A load beam 2 as a support member for supporting the head body 1 is formed using a plate spring material. At a tip portion of the load beam 2 the head body 1 is supported through a thin plate spring called flexure. A pivot 3 is formed in the shape of a concave sphere at the tip of the load beam 2 and its apex is in spot contact with the upper surface of the head body. The head body 1 is supported pivotably in both rolling and pitching directions with the apex of the pivot 3 as fulcrum.

In the conventional positioning process for the head body 1 and the load beam 2, two side faces of the slider of the head body 1 are positioned and held while being pressed against stepped portions 4a and 4b which are formed perpendicularly to each other on the upper surface of a carrier 4, the carrier 4 being moved in the direction of arrow L at each step of the positioning process. The carrier 4 with the head body 1 held thereon is located at a predetermined step position between carrier positioning blocks 5, 5, at which position the load beam 2 is installed on the carrier 4.

A pair of positioning pins 4c and 4d are implanted in the upper surface of the carrier 4, and positioning holes 2a and 2b formed in the load beam 2 are fitted on the positioning pins 4c and 4d, whereby the load beam 2 is positioned on the carrier 4. The load beam 2 is held with a jig in the thus positioned state on the carrier 4. In this state the flexure provided at the tip of the load beam 2 and the head body 1 are bonded and fixed together.

In the magnetic head of this type, the relative position between the head body 1 and the pivot 3 exerts a great influence on a floating posture of the head body on a recording medium such as a hard disk. However, the positioning method using the positioning apparatus shown in FIG. 8 has encountered a limit in determining a relative position between the head body 1 and the pivot 3 with a high accuracy.

More particularly, the position where the load beam 2 is to be installed is determined on the basis of the positioning holes 2a and 2b. But a machining tolerance in the relative position between the positioning holes 2a, 2b and the pivot 3 gives rise to an error in the position of the pivot 3 on the carrier 4. The head body 1 is positioned on the basis of the stepped portions 4a and 4b on the carrier 4 and therefore, as to the relative position of the pivot 3 and the head body 1, not only the aforesaid machining tolerance but also positional dimension tolerances between the stepped portions 4a, 4b and the positioning pins 4c, 4d of the carrier 4, as well as fitting clearance tolerances between the positioning pins 4c, 4d and the positioning holes 2a, 2b, are accumulated.

As a result, a maximum of about ±20 μm tolerance occurs between a designed abutment position of the pivot 3 on the head body 1 and an actual position where the pivot 3 abuts the head body 1. When the head body 1 assumes a floating posture on a recording medium such as a hard disk, the above ±20 μm error of the pivot position causes a difference of about ±7.8 nm in terms of a floating distance in the rolling direction and a difference of about ±1.6 nm in terms of a floating distance in the pitching direction.

Further, when the assembly of the head body 1 and the load beam 2 is incorporated in a hard disk device for example, a tolerance of about ±7.6 nm occurs in the floating distance of the head body 1 due to variations in static posture of the head body 1 on the recording medium or in the spring pressure of the load beam.

If the variation in the floating distance caused by the positioning error between the head body 1 and the load beam and the variation in the floating distance caused by variations in static posture or spring pressure are merely added together, the result obtained becomes very large, thus causing defective products whose variations in the floating distance of head body 1 exceed an allowable value. Consequently, the percentage defect becomes high.

Recently, with an increase in recording density, the slider of the head body 1 has become smaller in size and the floating distance of the head body has become shorter, resulting in the tolerance thereof becoming narrower. Therefore, it is necessary that the control of the floating distance be done with a high accuracy.

When attention is paid to variation factors in the floating distance, the attempt to minimize the variation in the floating distance caused by variations in static posture or spring pressure is restricted by the entire structure of the head, so in order to realize such attempt it is necessary that the relative position between the head body 1 and the pivot 3 formed in the load beam 2 be determined with a high accuracy.

As a method for determining a relative position between the head body 1 and the pivot 3, reference is here made to a method in which the bonded portion of the load beam 2 and the head body 1 and the vicinity thereof are photographed on a larger scale with a camera, then the distance between an edge portion of the slider of the head body and a central position of the pivot is determined on the image thus obtained, and a check is made to see if the distance is within the tolerance or not.

However, with such an image photographed by a camera, it is impossible to observe distances shorter than the arrangement pitch of photodetectors such as CCDs. For example, even if an attempt is made to specify an edge portion of the slider of the head body 1, it is impossible to specify its position at a distance shorter than the arrangement pitch of the photodetectors.

SUMMARY OF THE INVENTION

The present invention solves the above-mentioned problems of the prior art and it is an object of the invention to make it possible to determine a relative position between a head body and a support member.

It is another object of the present invention to make the detection of a boundary portion of, for example, a head portion possible up to a still shorter distance than the arrangement pitch of photodetectors in a camera.

According to the present invention, in one aspect thereof, there is provided a method for detecting a boundary line between areas different in light reflectance, using a camera with a large number of photodetectors arranged therein. The method comprises the steps of, subjecting an image obtained by the camera to image processing on the basis of light intensities detected by the photodetectors, when assuming that blocks where luminances corresponding respectively to the photodetectors appear on the image are unit blocks, comparing the luminances of plural unit blocks arranged in a predetermined direction, and specifying an actual position of the boundary line located in one unit block.

Preferably, variations in luminance between unit blocks arranged in the predetermined direction are derived and the derivated value of luminance in the unit block of highest luminance and the derivated values of luminance in plural unit blocks adjacent thereto are compared to specify an actual position of the boundary line located in one unit block.

In the present invention, the use of derivation does not constitute any special limitation. Even without using derivation, an actual position of the boundary line can be predicted and specified by comparing variations in luminance between adjacent unit blocks. However, if derivation is used, variations in luminance between unit blocks, as well as noises, can be offset, and the boundary line can be specified by predicting a peak position of luminance, thus making it possible to specify the boundary line with a high accuracy.

According to the present invention, the boundary line can be specified at a still shorter distance than the arrangement pitch of unit blocks which are constant in luminance, namely, the arrangement pitch of photodetectors in a CCD camera.

In the case where the boundary line is rectilinear, it is possible to add, or take a mean value of, derivated values of luminances of unit blocks in a row of the unit blocks arranged in parallel to the extending direction of the boundary line. It is also possible to perform such addition or calculation of a mean value in plural rows of unit blocks, then compare the added values or mean values between the rows to predict a peak position of the added values or mean values in a direction intersecting the boundary line, and specify the position of the boundary line on the basis of the peak position.

Given that a derivated value of luminance in each of adjacent unit blocks in an area including the boundary line is ai (i is a positive integer) and position coordinates of each unit block are Xi (or Yi), it is possible to specify an X coordinate position (or Y coordinate position) of the boundary line in accordance with $\Sigma(ai \times Xi)/\Sigma ai$ [or $\Sigma(ai \times Yi)/\Sigma ai$].

Where the boundary line is arcuate or curved, if a derivated value of luminance in each of adjacent unit blocks in an area including the boundary line is assumed to be ai (i is a positive integer) and the position of each unit block on X coordinates is Xi and that of each unit block on Y coordinates is Yi. It is possible to specify a peak position of the derivated luminance value in one unit block, and by connecting such peak positions between unit blocks it is possible to predict the boundary line.

Thus, where the boundary line is arcuate, it is possible to specify the circular arc by connecting the arc passing points in unit blocks and predict a central position of a circle on the basis of the circular arc.

According to the present invention, in another aspect thereof, there is provided a method for positioning a head body opposed to a recording medium and a support member for supporting the head body relative to each other. The method comprises the steps of: directing light to a combined portion of the head body and the support member and detecting the reflected light by means of a camera with a multitude of photodetectors arranged therein; detecting an edge portion of the head body in accordance with the boundary line detecting method described in any one of the first to fourth aspects of the invention; detecting the center of a concave pivot formed in the support member and serving as a fulcrum for pivotal motion of the head body in accordance with the boundary line detecting method described in the sixth aspect of the invention; adjusting the relative position between the head body and the support member so that the distance between the edge portion of the head body and the center of the pivot both detected in the preceding steps falls under a tolerance; and fixing the head body and the support member to each other, after the adjustment.

According to the present invention, in a further aspect thereof, there is provided a method for positioning between a head body opposed to a recording medium and a support member for supporting the head body. The apparatus comprises: a light radiating means for directing light to a combined portion of the head body and the support member; a camera with a large number of photodetectors arranged therein to detect the light reflected from the head body and the support member; an image processing means for processing an image detected by the photodetectors in the camera; and an adjusting means for adjusting the relative position between the head body and the support member so that distance between an edge portion of the head body and the center of a concave pivot both specified by the image processing means fall under a tolerance. In the image processing means, when blocks where luminances corresponding respectively to the photodetectors appear on the image are assumed to be unit blocks, luminances of plural unit blocks arranged in a predetermined direction are compared to specify an edge portion of the head body positioned in one unit block and a central position of the pivot.

In the above magnetic head positioning method and apparatus, the relative position may be adjusted by fixing the head body 1 and moving the support member, or by fixing the support member and moving the head body.

Irrespective of the above magnetic head positioning method and apparatus, the bounding line detecting method according to the present invention is applicable to the detection of the distance between other components as a method of detecting a boundary line between areas different in light reflectance.

BRIEF DESCRIPTION OF THE DRAWINGS

FIGS. 6A, 6B and 6C are explanatory views showing an example of a detection method for specifying the pivot center;

DESCRIPTION OF THE PREFERRED EMBODIMENT

According to the boundary line detecting method of the present invention, as summarized above, a boundary line between areas difference in light reflectance can be detected with an extremely high accuracy, and the position of the boundary line can be specified at a distance shorter than the arrangement pitch of pixels.

Moreover, if positioning of the magnetic head and that of the support member are performed using this detection method, the position of the head body can be determined with a high accuracy and it is possible to stabilize the floating distance of the head body.

Figure 1:
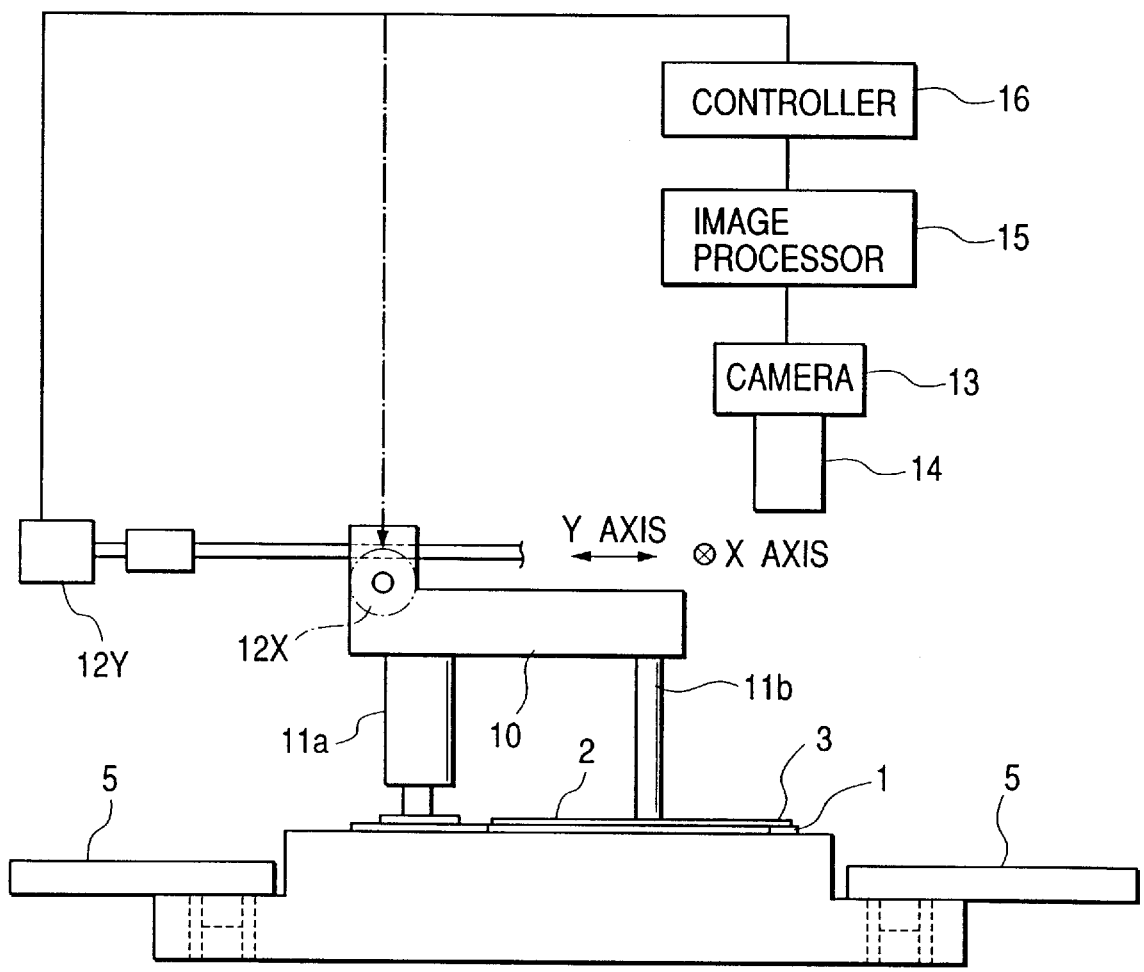
FIG. 1 is a side view showing a magnetic head positioning apparatus according to the present invention.

FIG. 1 is a side view of a magnetic head positioning apparatus embodying the present invention.

Figure 2:
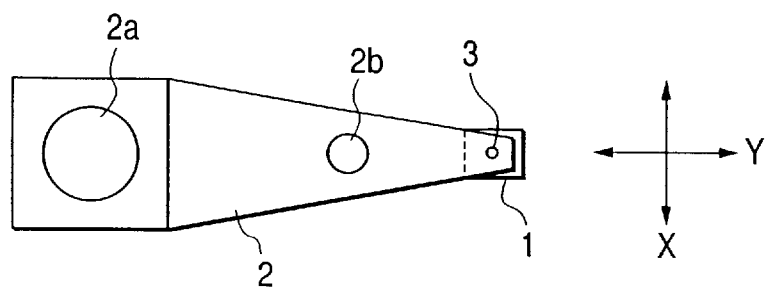
FIG. 2 is a plan view showing a combination of a head body and a support member.

According to this magnetic head positioning apparatus, there is performed positioning of such a magnetic head device, for example, a hard disk device as shown in FIG. 2.

As shown in FIG. 2, this magnetic head device comprises a head body 1 having a slider and a recording portion and a reproducing portion both of a thin film structure, and a load beam 2 as a support member which supports the head body 1 through a thin plate spring called flexure. At the tip of the load beam 2 is formed a pivot 3 which is in the shape of a concave sphere. The head body 1 is supported by the apex of the pivot 3 and is pivotable in both rolling and pitching directions with its supported point as fulcrum by virtue of elastic deformations of the flexure.

As shown in FIG. 1, on the upper surface of a carrier 4 are provided a positioning portion for positioning the head body 1 and a jig for holding and fixing the head body.

Above the carrier 4 is supported an adjusting slider 10 movably in an X-Y plane, and adjusting pins 11a and 11b are fixed to the adjusting slider 10. Positioning holes 2a and 2b formed in the load beam 2 are fitted on the adjusting pints 11a and 11b to hold the pins.

The adjusting slider 10 is moved a very short distance in the X-Y plane by both X-axis actuator 12X and Y-axis actuator 12Y, whereby a relative position of the load beam 2 with respect to the head body 1 is adjusted.

The X-axis actuator 12X and the Y-axis actuator 12Y can each be composed of a ball screw for moving the slider 10 and a stepping motor for rotating the ball screw. Alternatively, it may be constituted by a piezoelectric device for inching the adjusting slider 10 in the X-Y plane.

A camera 13 is disposed at a position opposed to a combined portion of both head body 1 and the tip of the load beam 2. A magnifying lens 14 is incorporated in the camera 13 so that a magnified image is detected by photodetectors such as CCDs disposed within the camera 13. The image obtained by the camera 13 is processed in an image processor 15, which is operated in accordance with a computer software program. On this basis of this image processing, a controller 16 is operated to control the feed of the adjusting slider 10 which is moved by the actuators 12X and 12Y.

Figure 3A:
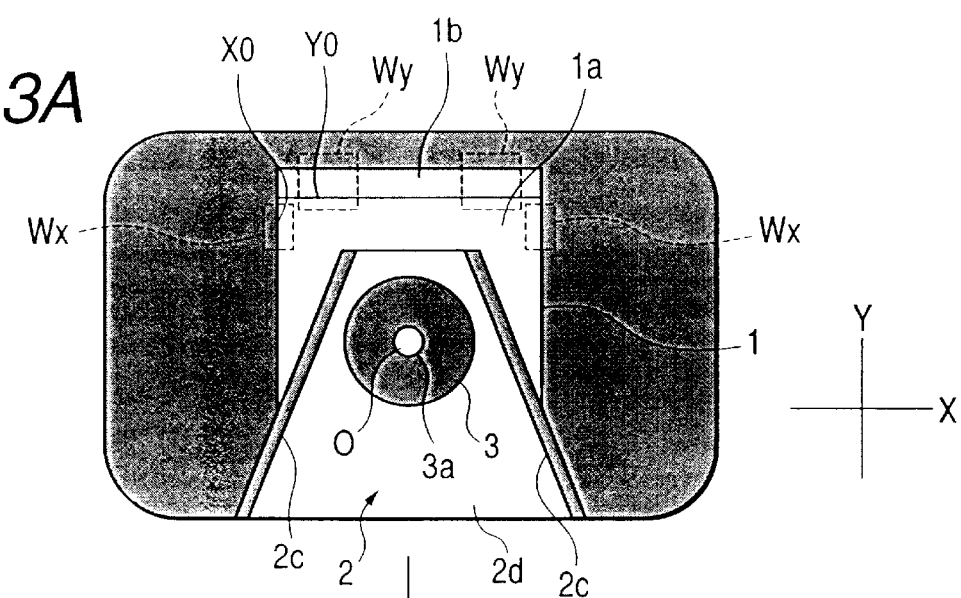
FIGS. 3A, 3B and 3C are explanatory views of an image processing for detecting an edge portion of a head body.
Figure 3B:
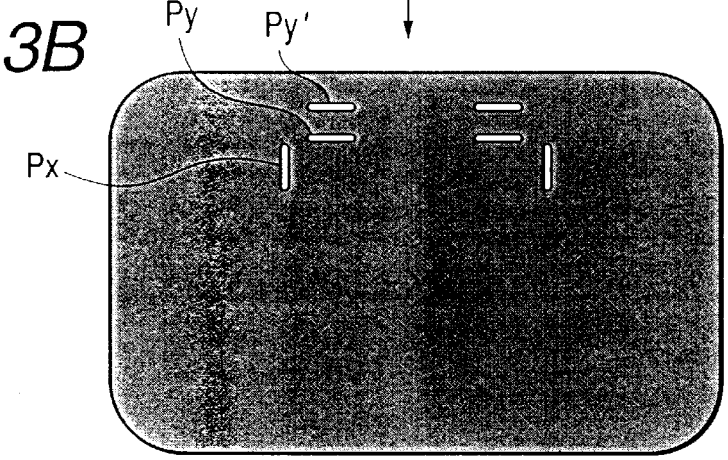
Figure 3C:
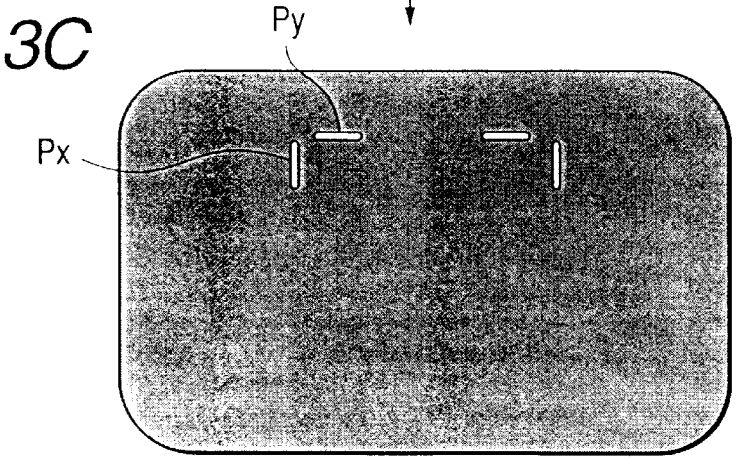
Figures 4A, 4B:
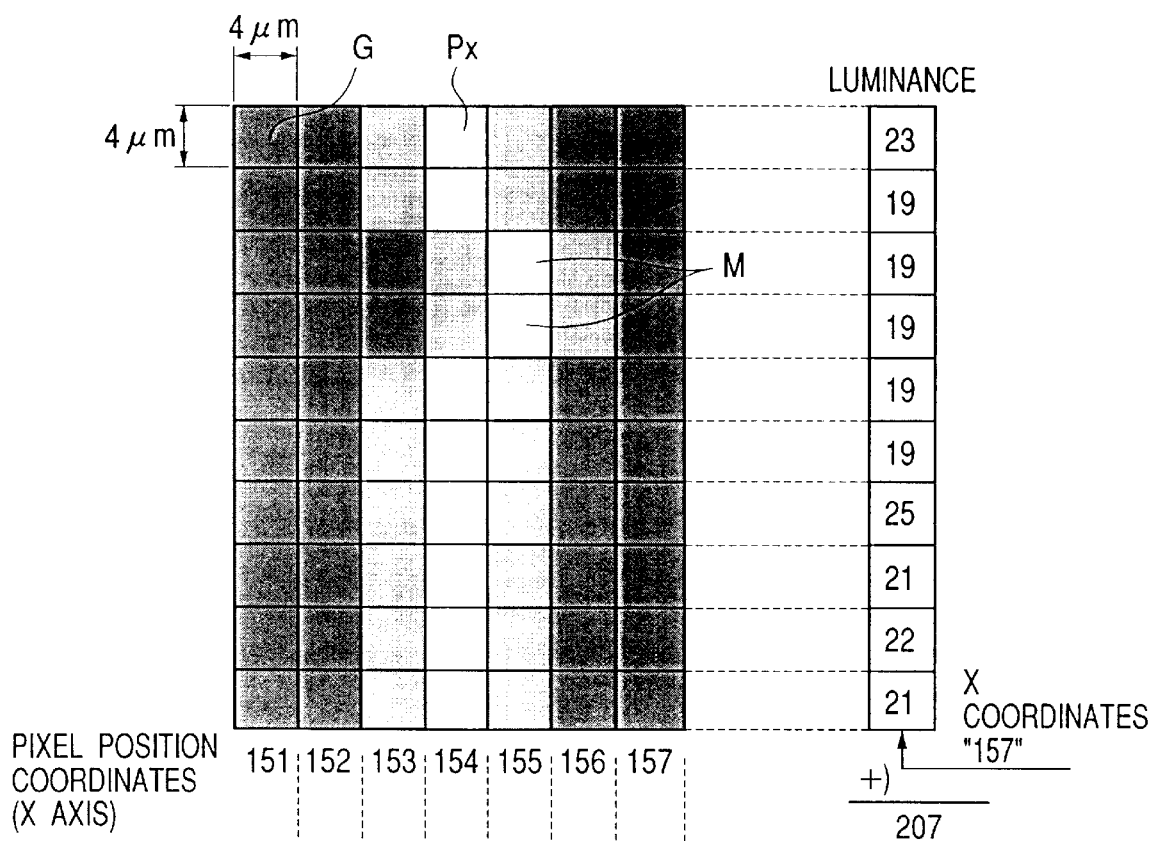
FIGS. 4A, 4B and 4C are explanatory views showing an example of a detection method for specifying the position of the edge portion of the head body.
Figure 4C:
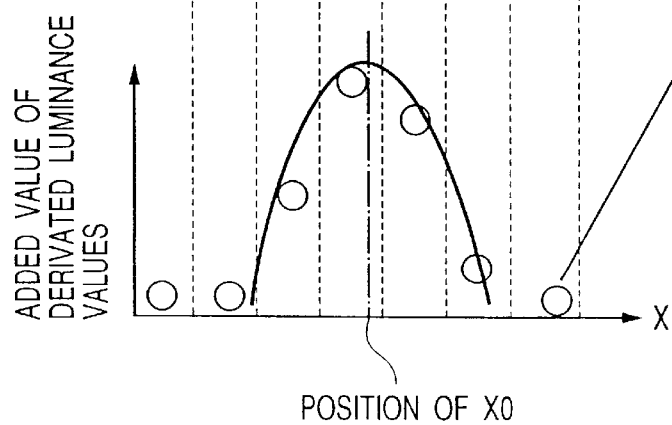

FIGS. 3A, 3B and 3C are explanatory views explaining image processing for an image of the combined portion of both head body 1 and the tip of the load beam 2, and FIGS. 4A, 4B and 4C are explanatory views explaining the process of specifying a boundary line of an edge portion of the head body 1.

FIG. 3A shows an image taken by the camera 13 after directing parallel rays of light to the combined portion of both the tip of load beam 2 and the head body 1 from just above by means of a light radiating device and after subsequent magnifying with the magnifying lens 14.

The load beam 2 is formed with bent portions 2c, 2c on both sides thereof. End faces of the bent portions 2c, 2c are cut faces by a pressing machine, and therefore, are low in the reflectance of light. For this reason, in the image shown in FIG. 3A, a plane portion 2d of the load beam 2 is high in luminance, while the end faces of the bent portions 2c, 2c are low in luminance.

Since the pivot 3 formed in the load beam 2 is in the shape of a concave sphere, substantially parallel rays of light directed thereto from above are reflected irregularly by the inner surface of the concave sphere. Therefore, the pivot 3 is low in luminance as a whole. However, at the apex (bottom) of the concave sphere of the pivot 3, the light is reflected just above, so that the circular area of a small diameter of the apex 3a becomes high in luminance.

In the head body 1 supported at the tip of the load beam 2, a thin film element 1b is attached to the trailing-side end face of the slider 1a, to constitute a recording portion of an inductive structure and a reproducing portion using an MR element for example. In the image shown in FIG. 3A, the light reflected from the upper surface of the slider 1a is strong and the luminance of the upper surface is the highest. The next highest luminance is of the thin film element 2b, the surroundings of which are dark.

In this image processing, an edge portion X0 of a side face located in X direction of the slider 1a and an edge portion Y0 of a side face located in Y direction of the slider are specified, and also specified is the center O of the apex 3a of the pivot 3. Then, the distances between the edge portions X0, Y0 of the slider 1a and the apex center O of the pivot 3 are measured. If the distances thus measured are beyond a tolerance, the X- and Y-axis actuators 12X, 12Y are operated to inch the position of the adjusting slider 10 and that of the load beam 2 in the X-Y plane, thereby adjusting the relative position of the head body 1 and the load beam 2 with respect to each other. Then, with keeping the distances being within the tolerance, the head body 1 is fixed bonding to the flexure of the load beam 2.

The following description is provided about the procedure for specifying a boundary line of the edge portion X0 of the slider 1 with use of image processing.

First, in the image shown in FIG. 3A, a window Wx is set in the portion including the edge portion X0 of the slider 1a, while a window Wy is set in the portion including the edge portion Y0.

In the window Wx, variations in luminance in X direction are derivated and variations in luminance in Y direction are also derivated. As a result, there appear peaks Px, Py and Py' in the portion where the luminance varies most abruptly (see FIG. 3B).

Since the peak Py' indicates a boundary line of the trailing-side end face of the thin film element 1b, it is erased, allowing the peaks Px and Py to remain, as shown in FIG. 3C. The peak Px ought to indicate a boundary line of the X-side edge portion X0 of the slider 1a and the peak Py ought to indicate a boundary line of the Y-side edge portion Y0 of the slider. Actually, however, when the combined portion of the tip of the load beam 2 and the head body 1 is magnified and taken as an image, it is impossible to specify a boundary line of the slider 1a with an accuracy shorter than the arrangement pitch of CCDs (photodetectors) in the camera 13.

Figure 8A:
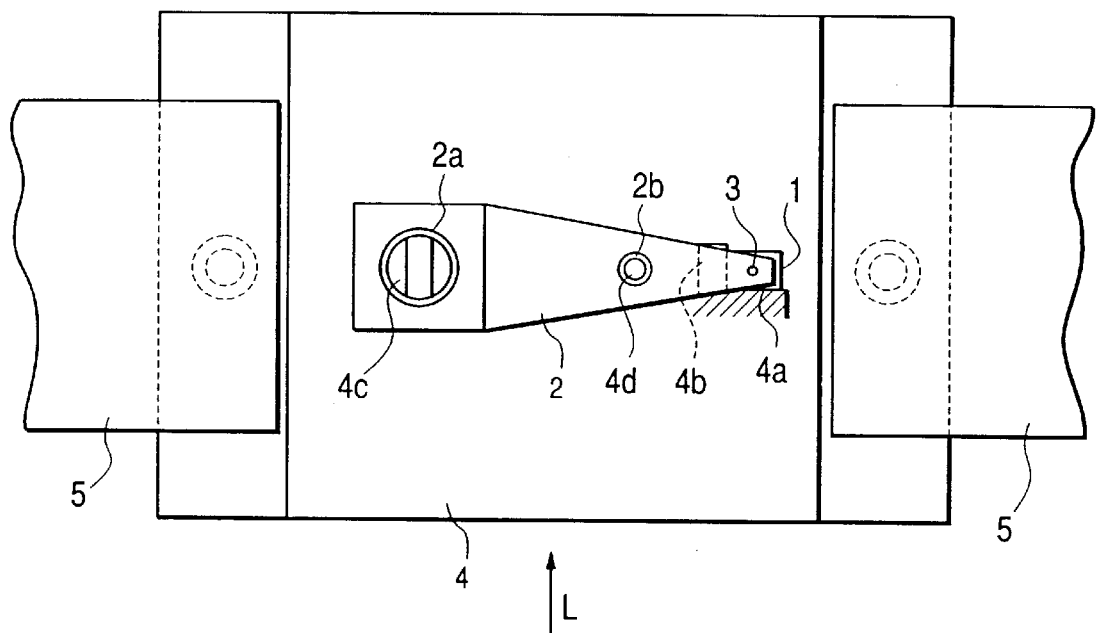
FIG. 8A is a plan view showing a conventional magnetic head positioning apparatus and FIG. 8B is a side view thereof.
Figure 8B:
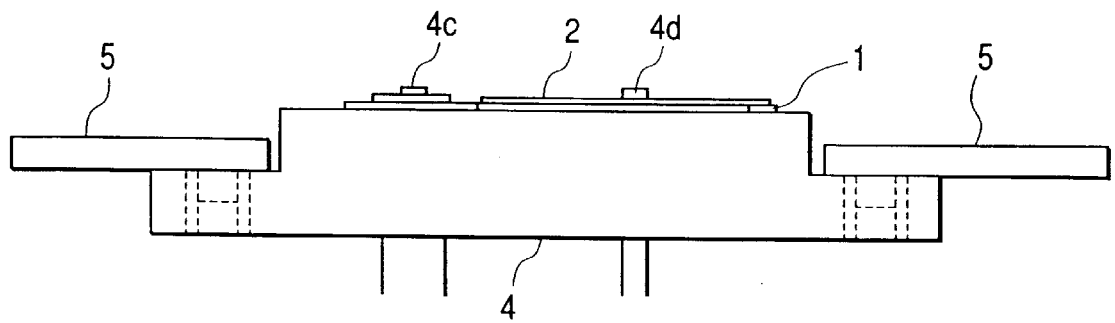

For example, when an image is taken by the camera 13 in a magnified state through the magnifying lens 14 and when the width of one photodetector (pixel) is made corresponding to the size of the slider 1a, the range capable of being detected by one photodetector is about 4 $\mu$m. In this case, if an attempt is made to binary-code the image luminance and specify the position of luminance peak Px or Py in terms of a binary digit (or binary number), there arises an error of ±4 $\mu$m in the position of peak Px or Py. Since this error is sufficiently smaller than the tolerance ±20 $\mu$m of the relative position between the head body 1 and the pivot 3 according to the conventional mechanical positioning method shown in FIG. 8. Therefore, as compared with the prior art, positioning with a higher accuracy can be done by specifying the edge portions X0 and Y0 of the slider 1a on the basis of the binary-coded luminance peaks.

In this embodiment, however, a boundary line of a slider edge portion can be specified with a still smaller value than the width (e.g. 4 $\mu$m) of each photodetector (pixel).

FIG. 4A shows the luminance peak Px portion in the image shown in FIG. 3C. In FIG. 4, a unit block G in the image represents an image block detected by one photodetector in the camera 13. For example, its width in each of X and Y directions is 4 $\mu$m, as noted previously. In FIG. 4A, coordinate positions of pixels (unit blocks G) in X-axis direction are represented as 151 to 157.

In image processing, variations in luminance are derivated with respect to X axis in the area where the window Wx is set, and in each unit block G the derived luminance value is not a binary digit, but is represented as a multi-value which varies analogwise.

In the image shown in FIG. 4A, the unit blocks with peak luminances give rise to variations on the coordinates and most of them are located in the position of X coordinates "154." In two unit blocks G of the portion M, a luminance peak is observed in the X coordinate position "155."

According to the boundary line detecting method of the present invention, the luminances of unit blocks where peaks appear and the luminances of unit blocks adjacent thereto are compared with each other to specify the actual boundary line of the slider edge portion X0. For example, the position of the slider edge portion X0 can be specified in accordance with the ratio of the number of unit blocks which peak in luminance at the X coordinate position "154" to the number of unit blocks which peak in luminance at the X coordinate position "155." In FIG. 4, for example, the number of unit blocks which peak in luminance at the X coordinate position "154" is 8 and that of unit blocks which peak in luminance at the X coordinate position "155" is 2, so it is possible to specify that the boundary line of the edge portion X0 is present at the X coordinate position of 154+ (8/10)=154.8.

Alternatively, as shown in FIG. 4B, by adding the luminances of unit blocks G arranged in a row extending in parallel with the direction in which the boundary line of the slider edge portion X0, it is possible to specify the luminance peak position. In FIG. 4B, the luminances of unit blocks arranged in Y direction at the X coordinate position "157" are digitized and then added together. In the same figure, the luminances of unit blocks located at the X coordinate position "157" are digitized like "23," "19," "19," . . . , and if the luminances in that row are added, the result is "207."

In each of the rows corresponding to X coordinate positions "151," "152," . . . of the unit blocks arranged in Y direction, that is, in each of the row with peak values positioned therein on the image and the rows adjacent thereto, the luminances of unit blocks are added.

FIG. 4C represents added luminance values graphically with respect to each of the rows arranged in Y direction. In each of the rows of X coordinate positions "151," "152," "153," luminance values are added and then compared for each row. In the same figure, if a curved line connecting the added values is drawn, a peak position (a predicted peak position) of that curved line can be specified to be the position of the boundary line of the slider edge portion X0.

Alternatively, there may be adopted a method wherein, in each of the rows extending in Y direction, a mean luminance value in unit blocks pixels) is determined to draw the curved line shown in FIG. 4C, and a peak value of the curved line is specified to be the position of the edge portion X0.

Further, in the window Wy shown in FIG. 3A, by adding the luminances of unit blocks, or pixels, in each of the rows arranged in X direction or taking a mean value thereof, it is possible to specify the boundary line of the Y-side edge portion Y0 of the slider 1a.

Referring now to FIGS. 5A, 5B, 5C, 6A, 6B, 6C and 7, there is illustrated an image processing method for specifying the center of the apex 3a of the pivot 3 formed in the load beam 2.

Figure 5A:
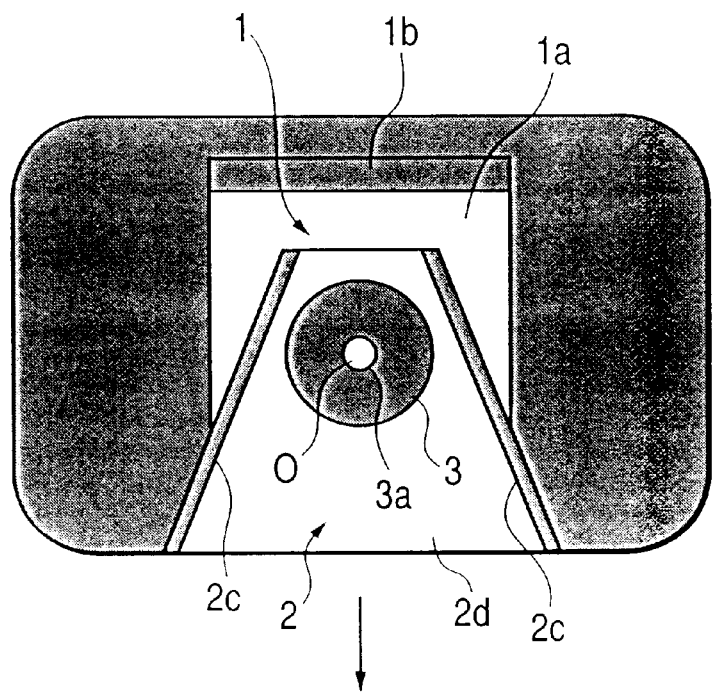
FIGS. 5A, 5B and 5C are explanatory views of an image processing for detecting the center of a pivot provided in a support member.
Figure 5B:
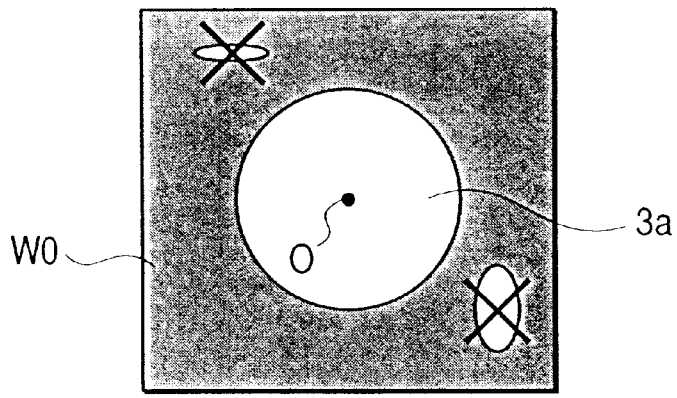
Figure 5C:
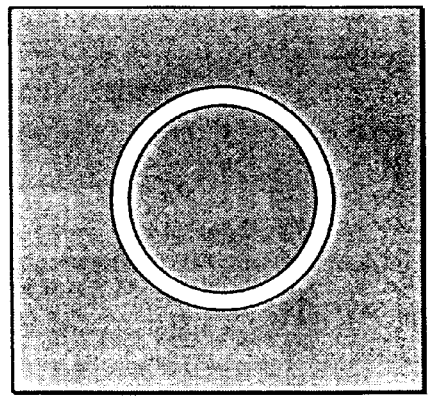

First, as shown in FIG. 5B, a window Wo is set in the area which includes a high luminance circle of a small diameter of the pivot apex 3a. At this time, varying luminance portions other than the circle of a predetermined size are ignored as indicated with "cross mark" in FIG. 5B. By determining a curvature center of the circle appearing in the window Wo it is possible to specify the center O of the pivot apex 3a. But in the following example, for the purpose of specifying the center O more accurately, luminance variations near the circle contour (boundary line) of the apex 3a are derivated to obtain a circle wherein the derivated luminance values afford peak values, as shown in FIG. 5C.

Figure 7:
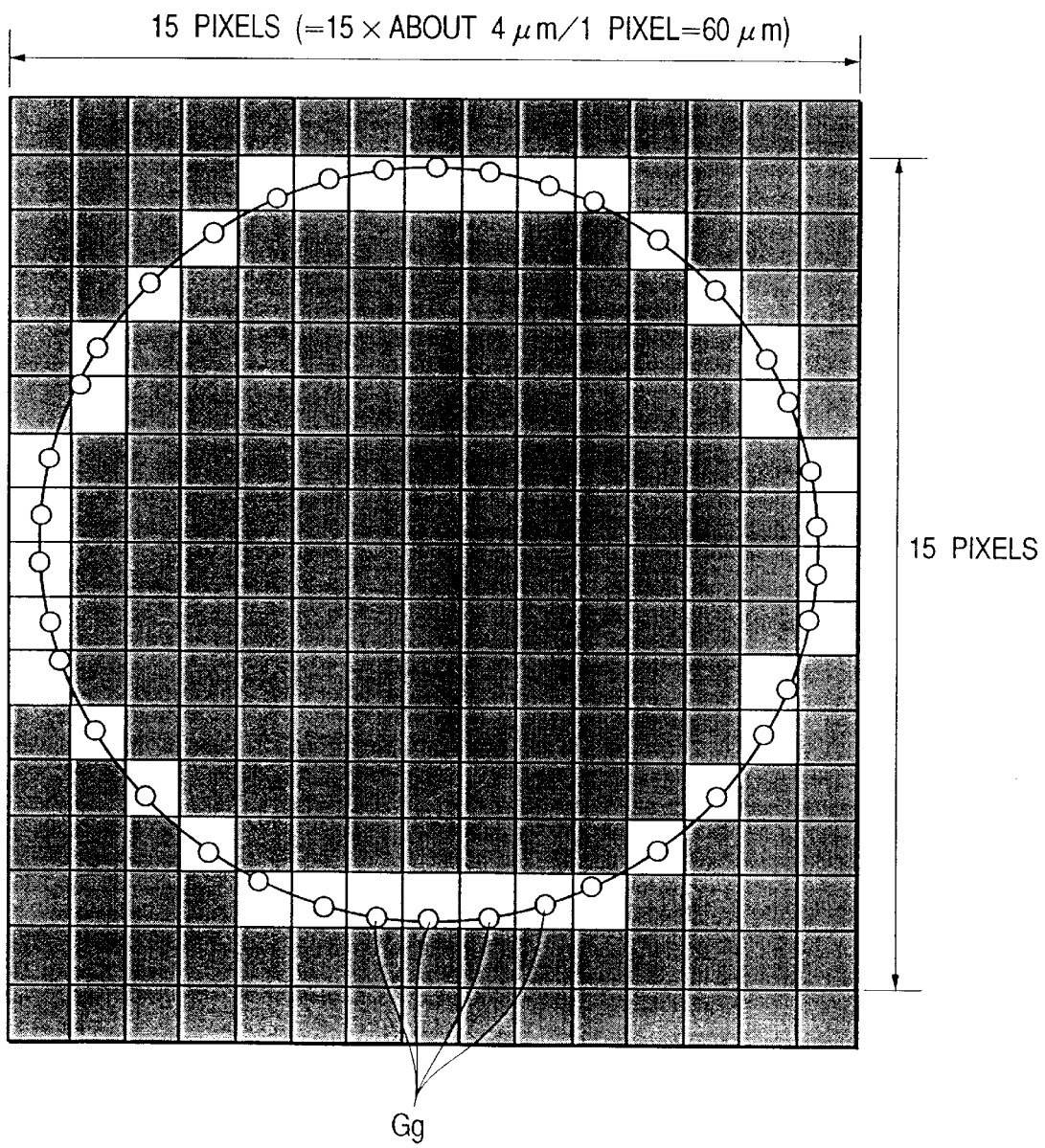
FIG. 7 is a plan view showing a specified circular contour of an elliptic portion of the pivot.

However, since the circle is extremely small in diameter, for example as shown in FIG. 7, there is not formed an accurate circle by peak pixels of the highest derivated luminance value on the image. There is a limit to the precision in specifying the center O of circle.

Therefore, by performing the image processing shown in FIG. 6, it is made possible to specify the original peak position of derivated luminance value, i.e., a passage point through which the original circular contour passes, within a single pixel (unit block G).

First, as shown in FIG. 6A, the point through which the circular contour passes is specified for each unit block along the same contour. FIG. 6B shows the portion W01 in FIG. 6A on a larger scale. In the portion W01 through which the circular contour passes, X coordinate positions Xi with pixels (unit blocks G) located therein are assumed to be "135," "136," "137" and such Y coordinate positions Yi are assumed to be "311," "312," "313."

In FIG. 6B, the unit block G (136, 312) at the central coordinate position (Xi, Yi)=(136, 312) is high in its derivated value of luminance. Then, the position of the circular contour passing point Gg in the unit block G (136, 312) is specified.

First, with respect to the unit block G (136, 312) and unit blocks adjacent thereto, a comparison is made between variations in derivated luminance values in X-axis direction and those in Y-axis direction.

For X axis, the unit block G (136, 312) is compared with unit block G (135, 312) adjacent thereto on the left side and unit block G (137, 312) adjacent thereto on the right side with respect to their derivated luminance values. FIG. 6C shows derivated luminance values ai of unit blocks in a digitized form. The derivated luminance value ai of unit block G (136, 312) is "121," that of unit block G (135, 312) is "56," and that of unit block G (137, 312) is "135."

Therefore, if $\Sigma(ai \times Xi)/\Sigma ai$ is calculated, there is obtained $\{(56 \times 135)+(121 \times 136)+(135 \times 137)\}/(56+121+135)=136.25$. This is a peak position of the derivated luminance values, i.e., X coordinate position of the circular contour passing point Gg, in the unit block G(136, 312).

For Y axis, the unit block G (136, 312) is compared with unit block G (136, 311) adjacent just above thereto and unit block G (136, 313) adjacent just under thereto with respect to their derivated luminance values. As shown in FIG. 6C, the derivated luminance values ai of unit blocks G(136, 312), G(136, 311) and G(136, 313) are "121," "90" and "70," respectively.

If $\Sigma(ai \times Yi)/\Sigma ai$ is calculated, there is obtained $\{(90 \times 311)+(121 \times 312)+(70 \times 313)\}/(90+121+70)=311.92$. This is a peak position of the derivated luminance values, i.e., Y coordinate position of the circular contour passing point Gg, in the unit block G(136, 312).

It follows that the coordinates of the point Gg through which the circular contour of the actual boundary line passes in the unit block G (136, 312) are Gg(136.25, 311.92).

By determining the coordinates of points Gg in unit blocks of high derivated luminance values and then connecting the points Gg it is made possible to specify the contour of the apex 3a of the pivot 3 as such an exact circle as shown in FIG. 7. By calculating a curvature center of this circle it is possible to specify the center O of the apex 3a.

In the positioning apparatus shown in FIG. 1, a relative position between the head body 1 and the load beam 2 is determined so that X and Y coordinate distances between the edge portions X0, Y0 of the slider 1a and the center O of the pivot 3a fall under the tolerance, and then the head body 1 is fixed relative to the load beam 2.

The adoption of the above image processing makes it possible to specify the position of luminance boundary (peak in derivation) in each unit block (pixel) of about 4 μm square. Therefore, the error of the coordinates of the pivot center O with respect to the edge portions X0 and Y0 of the slider 1 can be suppressed to within the range of ±1 μm. Thus, the positioning of the head body 1 and the load beam 2 relative to each other can be done with a high accuracy.

Further, by suppressing the error of the pivot center coordinates to ±1 μm or less, the floating distance variation in the rolling direction can be suppressed to ±0.39 nm or less, which is approximately one twentieth of the conventional floating variation (±7.8 nm) in the rolling direction. Besides, the floating variation in the pitching direction can be suppressed to ±0.08 nm or less, which is approximately one twentieth of the conventional floating variation (±1.6 nm) in the pitching direction.

What is claimed is:

1. A boundary line detecting method for detecting a boundary line between areas different in light reflectance by using a camera with a multitude of photodetectors arranged therein, said boundary line detecting method comprising the steps of:

subjecting an image obtained by the camera to image processing on the basis of light intensities detected by said photodetectors;

comparing luminances of plural unit blocks arranged in a predetermined direction, the luminances of said plural unit blocks corresponding respectively to the light intensities detected by said photodetectors; and specifying an actual position of the boundary line located in one unit block, wherein the actual position of the boundary line is located with a precision that is greater than a width of one unit block, wherein variations in luminance between unit blocks arranged in the predetermined direction are derivated, and a derivated value of luminance in the unit block of highest luminance and other derivated values of luminance in plural unit blocks adjacent thereto are compared to specify an actual position of the boundary line in one unit block, and wherein, in the case where said boundary line is a straight line, derivated values of luminance in a row of unit blocks arranged in parallel with an extending direction of the boundary line are added or a mean value thereof is calculated, the addition or calculation of a mean value is performed in plural rows of unit blocks, then the added values or mean values are compared between the rows to predict a peak position of the added values or the mean values in a direction intersecting the boundary line, and the position of the boundary line is specified on the basis of said peak position.

2. A boundary line detecting method for detecting a boundary line between areas different in light reflectance by using a camera with a multitude of photodetectors arranged therein, said boundary line detecting method comprising the steps of:

subjecting an image obtained by the camera to image processing on the basis of light intensities detected by said photodetectors;

comparing luminances of plural unit blocks arranged in a predetermined direction, the luminances of said plural unit blocks corresponding respectively to the light intensities detected by said photodetectors; and specifying an actual position of the boundary line located in one unit block, wherein the actual position of the boundary line is located with a precision that is greater than a width of one unit block, wherein variations in luminance between unit blocks arranged in the predetermined direction are derivated, and a derivated value of luminance in the unit block of highest luminance and other derivated values of luminance in plural unit blocks adjacent thereto are compared to specify an actual position of the boundary line in one unit block, and wherein, given that a derivated value of luminance in each of adjacent unit blocks in an area including the boundary line is ai (i is a positive integer) and position coordinates of each unit block are Xi (or Yi), an X coordinate position (or Y coordinate position) of the boundary line is specified in accordance with $\Sigma(ai \times Xi)/\Sigma ai$ [or $\Sigma(ai \times Yi)/\Sigma ai$].

3. A boundary line detecting method for detecting a boundary line between areas different in light reflectance by using a camera with a multitude of photodetectors arranged therein, said boundary line detecting method comprising the steps of:

subjecting an image obtained by the camera to image processing on the basis of light intensities detected by said photodetectors;

comparing luminances of plural unit blocks arranged in a predetermined direction, the luminances of said plural unit blocks corresponding respectively to the light intensities detected by said photodetectors; and specifying an actual position of the boundary line located in one unit block, wherein the actual position of the boundary line is located with a precision that is greater than a width of one unit block, wherein variations in luminance between unit blocks arranged in the predetermined direction are derivated, and a derivated value of luminance in the unit block of highest luminance and other derivated values of luminance in plural unit blocks adjacent thereto are compared to specify an actual position of the boundary line in one unit block, and wherein if the boundary line is arcuate or curved and if a derivated value of luminance in each of adjacent blocks in an area including the boundary line is assumed to be ai (i is a positive integer) and the position of each unit block on X coordinates is Xi and that of each unit block on Y coordinates is Yi, a peak position of the derivated luminance value in one unit block is specified in accordance with $\Sigma(ai \times Xi)/\Sigma ai$ and $\Sigma(ai \times Yi)/\Sigma ai$, and the boundary line is predicted by connecting said peak positions in the unit blocks.

4. A boundary line detecting method for detecting a boundary line between areas different in light reflectance by using a camera with a multitude of photodetectors arranged therein, said boundary line detecting method comprising the steps of:

subjecting an image obtained by the camera to image processing on the basis of light intensities detected by said photodetectors;

comparing luminances of plural unit blocks arranged in a predetermined direction, the luminances of said plural unit blocks corresponding respectively to the light intensities detected by said photodetectors; and specifying an actual position of the boundary line located in one unit block, wherein the actual position of the boundary line is located with a precision that is greater than a width of one unit block, wherein variations in luminance between unit blocks arranged in the predetermined direction are derivated, and a derivated value of luminance in the unit block of highest luminance and other derivated values of luminance in plural unit blocks adjacent thereto are compared to specify an actual position of the boundary line in one unit block, wherein if the boundary line is arcuate or curved and if a derivated value of luminance in each of adjacent blocks in an area including the boundary line is assumed to be ai (i is a positive integer) and the position of each unit block on X coordinates is Xi and that of each unit block on Y coordinates is Yi, a peak position of the derivated luminance value in one unit block is specified in accordance with $\Sigma(ai \times Xi)/\Sigma ai$ and $\Sigma(ai \times Yi)/\Sigma ai$, and the boundary line is predicted by connecting said peak positions in the unit blocks, and wherein if the boundary line is arcuate, the circular arc is specified by connecting arc passing points in the unit blocks, and a central position of a circle is predicted on the basis of the circular arc.

\* \* \* \* \*